United States Patent
Harrington

(10) Patent No.: US 6,636,616 B1
(45) Date of Patent: Oct. 21, 2003

(54) METHOD AND APPARATUS FOR DIGITAL WATERMARKING USING ERROR DIFFUSION

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/451,994

(22) Filed: Nov. 30, 1999

(51) Int. Cl.[7] ................................................ G06K 9/00
(52) U.S. Cl. ........................................................ 382/100
(58) Field of Search ................................ 382/100, 190; 358/466

(56) References Cited

U.S. PATENT DOCUMENTS

| | | | | |
|---|---|---|---|---|
| 5,307,425 A | * | 4/1994 | Otsuka ........................ | 358/465 |
| 5,530,759 A | * | 6/1996 | Braudaway et al. .......... | 380/54 |
| 5,734,752 A | | 3/1998 | Knox ........................... | 382/212 |
| 5,790,703 A | | 8/1998 | Wang ........................... | 382/212 |
| 6,016,510 A | * | 1/2000 | Quattromani et al. ........ | 709/233 |
| 6,307,949 B1 | * | 10/2001 | Rhoads ........................ | 382/100 |

OTHER PUBLICATIONS

"A Digital Watermark" by R.G. vanSchyndel, A.Z. Tirkel, and C.F. Osborne, 0–8186–6960–0/94, 1994 IEEE.

* cited by examiner

Primary Examiner—Leo Boudreau
Assistant Examiner—Tom Y. Lu
(74) Attorney, Agent, or Firm—Fay, Sharpe, Fagan, Minnich & McKee, LLP

(57) ABSTRACT

A method is described to imbed hidden information in output images that are rendered using error diffusion. The idea is to introduce a bias in the dot placements and then modulate that bias with the pattern to be hidden. The method particularly involves the steps of rendering the output copy using an error diffusion routine that parses through a plurality of stored pixels representing an image; modifying the error diffusion routine with a biasing pattern that influences where on the output copy each of the plurality of pixels is rendered; and further modifying the error diffusion routine with a watermark pattern that modifies the biasing pattern for pixels that are positioned within the watermark.

18 Claims, 3 Drawing Sheets

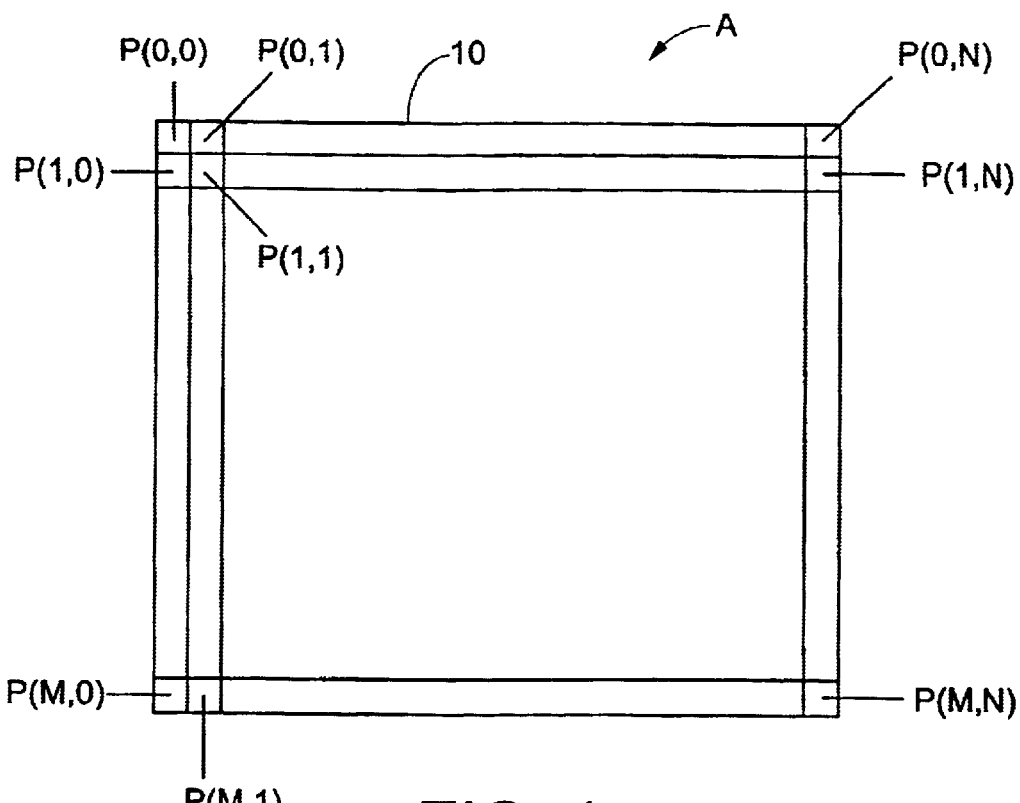
FIG. 1
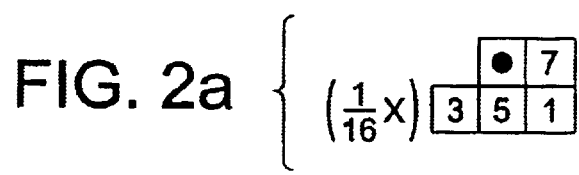
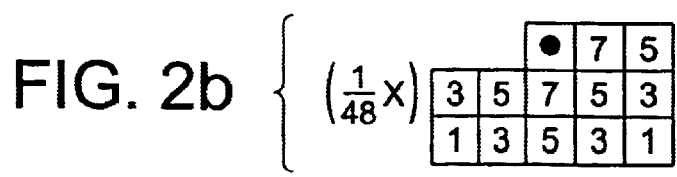
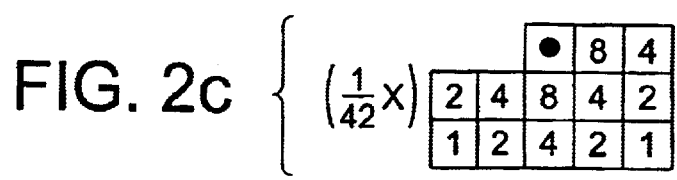

METHOD AND APPARATUS FOR DIGITAL WATERMARKING USING ERROR DIFFUSION

BACKGROUND OF THE INVENTION

The present invention relates to the document processing arts. The invention finds particular application in conjunction with a method and apparatus for imbedding hidden information in documents that are rendered using error diffusion, and will be described with particular reference thereto.

Images captured in electronic form can be easily copied, distributed, and even altered. It can sometimes be valuable to identify the source and integrity of an image. One approach is to include information within the image which is normally not visible, but which can be detected if desired. This information can identify the owner of the image or might reveal image alterations. This hidden information is typically referred to as a digital watermark. It is desirable to have the digital watermark present, not only in the electronic image, but also in prints or output copies of the electronic image. One would like the watermark to be preserved even if the print or output copy is itself copied or scanned.

Image information, be it color or black and white, is commonly derived by scanning, initially at least, in a gray level format containing a large number of gray intensity levels, such as 256 levels for color, which is usually not reproducible on standard output devices such as binary printers, etc. Digital halftoning converts image information comprising a large number of gray scaled pixel values to a reduced number of gray scaled pixel values in order that image information can be rendered for display or hardcopy (i.e. printed) output.

Error diffusion is another technique that converts gray level images to binary or a lesser level of gray while attempting to preserve an overall gray density of the images. Error diffusion attempts to maintain overall gray density by making the conversion from gray pixels to binary or other level pixels on a pixel-by-pixel basis. The procedure examines each pixel value with respect to a threshold. If the pixel value is darker than the threshold a black dot is imaged, otherwise white is printed. The difference between the value printed (black or white) and the actual pixel value of is calculated and distributed among the neighboring pixels that have yet to be rendered.

Accordingly, it has been considered desirable to develop a new and improved method and apparatus for imbedding hidden information in output documents and copies or scanned images of output documents using an error diffusion rendering technique, which meets the above-stated needs and overcomes the foregoing difficulties and others while providing better and more advantageous results.

SUMMARY OF THE INVENTION

In accordance with one aspect of the present invention, a method for imbedding a watermark in an output copy is disclosed. The method includes the steps of a) providing an image representation defined by a plurality of pixels; b) comparing a first pixel intensity value to a threshold value; c) rendering a dot on an output copy, the dot having a second intensity value based on the comparison of step b); d) distributing a difference between the first and second intensity values among a plurality of pixels located proximate the first pixel; e) modifying the threshold value with a biasing value and a watermark value; and f) repeating steps a)–e) for each of the plurality of pixels.

In accordance with another aspect of the present invention, a method for imbedding a watermark in an output copy is disclosed. The method includes the steps of a) providing an image representation defined by a plurality of pixels; b) rendering a pixel based on a threshold value, a biasing value, and a watermark value; c) modifying the threshold value by varying at least one of the biasing value and the watermark value to influence whether a dot is generated in the output copy; and d) repeating steps b) and c) for each of the plurality of pixels.

In accordance with yet another aspect of the present invention, a method for imbedding a watermark in an output copy is disclosed. The method includes the steps of a) storing an image representation defined by a plurality of pixels; b) rendering the output copy using an error diffusion routine that parses through the plurality of stored pixels; c) modifying the error diffusion routine in step b) with a biasing pattern that influences where on the output copy each of the plurality of pixels is rendered; and d) further modifying the error diffusion routine in step b) with a watermark pattern that modifies the biasing pattern for pixels that are positioned within the watermark.

One advantage of the present invention is the provision of a method for imbedding hidden information in images that are rendered using error diffusion.

Another advantage of the present invention is the provision of a method for introducing a bias in the dot placements of a rendering algorithm and then modulating that bias with a pattern to be hidden.

Yet another advantage of the present invention is the provision of a method for imbedding a watermark in an output document that cannot be destroyed by subsequent copying and/or scanning of the document.

A still further advantage of the present invention is the provision of a method for authenticating a digital image by simply superimposing a biasing pattern over the image.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

FIG. 1 illustrates a digital representation of an image having M number of scan lines with N number of picture elements per scan line;

FIGS. 2a–2c illustrate a number of exemplary error filters for distributing a calculated intensity error value among various neighboring and/or adjoining pixels when performing an error diffusion process as part of the present invention;

DETAILED DESCRIPTION OF THE PREFERRED EMBODIMENT(S)

Figure 3:
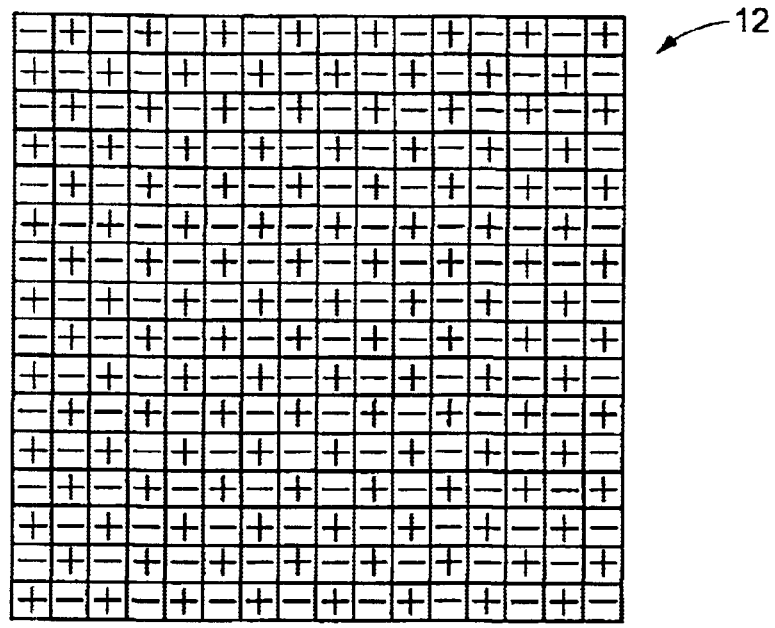
FIG. 3 illustrates a pixel-wise checkerboard biasing pattern for modulating a threshold value when performing an error diffusion process as part of the present invention.

In the following detailed description of the present invention, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as an array of charge couple devices commonly referred to as CCDs. Line by line scanning of an image bearing the original for the duration of image data is well known and does not form a part of the present invention.

Image data may also be derived by a computer workstation program in accordance with document creation application software or from a data storage device. In content, the original video image signals may be composed entirely of a single image component such as lines, text, low frequency halftones, high frequency halftones, contones, or any combination thereof.

Moreover, in describing the present invention, it is assumed that the video signal has a value in a range between 0 and 255. However, any range from the video signal can be utilized in conjunction with the present invention. Furthermore, in the following description, the term "gray level" will be used to describe both black and white and color applications.

Furthermore, in describing the present invention, the term "pixel" may refer to an electrical, (or optical, if fiber optics are used), signal which represents the physical measurable optical properties at a physical definable area on a receiving medium. The receiving medium can be any tangible document, photoreceptor, or marking material transfer medium.

Moreover, the term "pixel" may refer to an electrical, (or optical, if fiber optics are used), signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

The term "pixel," in the scanning environment, may refer to an electrical, (or optical, if fiber optics are used), signal which represents physical optical property data generated from a signal photosensor cell when scanning a physical image so as to convert the physical optical properties of the physical image to an electronic or electrical representation. In other words, in this situation, a pixel is an electrical, (or optical), representation of the physical optical properties of a physical image measured at a physical definable area on a optical sensor.

Lastly, the term "pixel" in the rendering environment, may refer to an electrical, (or optical, if fiber optics are used), signal which represents the smallest physical area on a recording substrate that can be rendered. In other words, in this situation, a pixel is an electrical, (or optical), representation of the physical spot created by a laser in a laser printed image or the physical spot created by the smallest rendered ink droplet.

With reference to FIG. 1, a digital representation of an image A is stored in an image buffer, register, memory, or the like 10. The image A can be sampled and quantized using a scanner, digital camera, frame grabber, or other digitizing input device. The image A is stored as a two-dimensional array of binary numbers having N number of picture elements (i.e. pixels) per M number of raster or scan lines. For example, a 512×512 image would have 262,144 picture elements.

The stored binary numbers represent image information such as gray scale intensity (P). The gray scale intensity values can represent a black-and-white image. Alternatively, the gray scale intensity values can represent one of the red, green, and blue components of a color image.

The image A can be digitally represented with any number of bits per pixel. Typically, gray scale images are represented with one byte (eight bits)/pixel. This allows each pixel intensity to span a full range from "completely on" to "completely off". For example, in the rendering environment, the "completely on" state signifies black with an intensity value of 255, and the "completely off" state signifies white with an intensity value of 0. A color image can be represented with three bytes (24 bits)/pixel where each byte represents the gray scale intensity (P) of one color component (red, green, blue) of the color image. However, color maps or look-up tables can also be used to represent a color image with one or two bytes per pixel.

A digital watermark can be imbedded within the stored image representation on pixel-by-pixel basis, such as when generating an output copy of the image representation on a printer, or when sending the stored image representation across a network.

As previously indicated, the idea in error diffusion is to compare each pixel intensity value (after a revision) to a predetermined threshold value (e.g. 127). Thus, if the intensity value of the pixel located at position x, y is P(x, y) and the threshold is T, then the conventional error diffusion test is:

$$\text{if}(P(x,y)>T)$$

If the intensity value (P) is darker (i.e. greater) than the threshold value (T), a black dot is imaged, otherwise white is printed. The difference between the value printed (black or white) and the actual pixel intensity value is calculated and distributed among the neighboring pixels that have yet to be rendered. That is, the difference or error between the value printed (0 or 255) and the actual pixel intensity value (P) is distributed among various neighboring and/or adjoining pixels. This distribution of error constitutes the revision of the pixel values.

FIG. 2 illustrates a number of conventional error filters that can be used to distribute the difference value between the neighboring pixels. In particular, FIG. 2a shows a Floyd and Steinberg error filter which divides the difference value into sixteenths and weights the difference distribution among four adjoining pixels. FIG. 2b shows a Jarvis, Judice, and Ninke error filter which divides the difference value into forty-eighths and weights the difference distribution among twelve adjoining and neighboring pixels. FIG. 2c shows a Stucki error filter which divides the difference value into forty-seconds and weights the difference distribution among twelve adjoining and neighboring pixels. In addition to diffusing difference values among adjoining and neighboring pixels with the above-described error diffusion algorithm, other error diffusion algorithms can be used.

The conventional error diffusion test is modified in order to introduce a digital watermark into the output document. Initially, the conventional error diffusion test is modified to modulate the threshold value (T) with a high-frequency pattern with zero mean to slightly bias the dot placements. For example, as shown in FIG. 3, a checkerboard biasing pattern 12 can be used to modulate the threshold value (T). The checkerboard biasing pattern makes it slightly more favorable to place dots on, for example, the black squares of a checkerboard (indicated by the negative (−) signs) instead of the red squares (indicated by the positive (+) signs). Thus, the modified error diffusion test, implemented in the C programming language, is:

if $(P(x,y) > T + B*((x\%2)*2-1)*((y\%2)*2-1))$ where B is the amount of biasing, and the expression $((x\%2)*2-1)*((y\%2)*2-1)$ returns alternating +1 and −1 coefficients in a checkerboard pattern as shown in FIG. 3. Thus, the expression $((x\%2)*2-1)*((y\%2)*2-1)$ alternates between adding a biasing value (B) to the threshold value (T) and subtracting the biasing value (B) from the threshold value (T) as one steps between the black and red squares of a checkerboard overlaid on the pixel raster of FIG. 1.

It should be appreciated that, in the above expression, the (*) operator signifies multiplication, and modulus operator (%) returns a value of (1) for odd values of x and y, and returns a value of (0) for even values of x and y. The greater the value of B, the stronger the influence that the biasing pattern will have on placing dots. The biasing value B can be in the range of about 0 to about 10. It should also be appreciated that a biasing pattern (such as a checkerboard biasing pattern can be stored in a look-up table rather than being generated on-the-fly from an analytic expression.

A digital watermark is introduced into the output copy by reversing the phase of the biasing. For example, outside the watermark, the biasing pattern makes it slightly more favorable to place dots on the red squares of the checkerboard rather than the black squares, while within the watermark the biasing pattern makes it slightly more favorable to place dots on the black squares rather than the red squares. Thus, a further modification to the conventional error diffusion test is to modulate the threshold value (T) with a watermark value (W). Thus, the further modified error diffusion test, implemented in the C programming language, is:

if $(P(x,y) > T + W(x,y)*B*((x\%2)*2-1)*((y\%2)*2-1))$ where W(x,y) defines the watermark.

W(x,y) is a function that ranges between −1 and +1. It is −1 outside the watermark and +1 inside the watermark. W(x,y) should also change smoothly between the −1 and +1 values to avoid abrupt visible transitions in the image. Except for the restriction to smooth transitions, any watermark shape can be used. For example letters, numbers, logos and/or other symbols may be defined. Note that W(x,y) can be implemented by table lookup and need not be an analytic function.

Thus, if the intensity value (P) of a given pixel (x, y) is greater than the expression $T + W(x,y)*B*((x\%2)*2-1)*((y\%2)*2-1)$, a black dot is imaged and the difference between the intensity value (P) and the "completely on" intensity value 255 is distributed among various neighboring and/or adjoining pixels. Otherwise, the difference between the intensity value (P) and the "completely off" intensity value 0 is distributed among various neighboring and/or adjoining pixels. This modified error diffusion test is repeated on a pixel-by-pixel basis as with conventional error diffusion routines.

Figure 4:
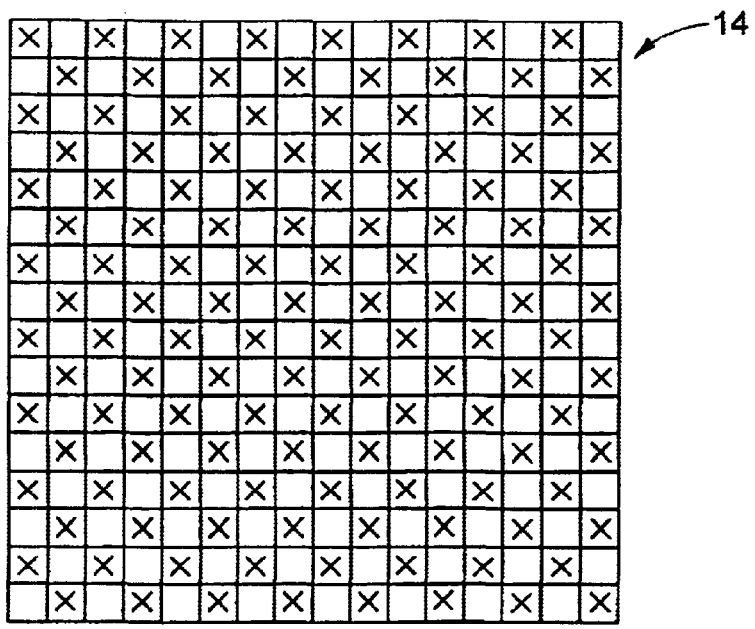
FIG. 4 illustrates a 50% gray image rendered with the checkerboard biasing pattern of FIG. 3.
Figure 5:
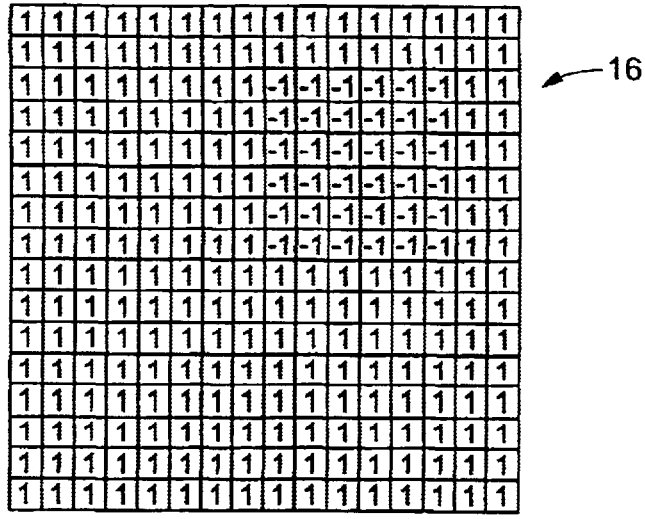
FIG. 5 illustrates a look-up table defining an exemplary watermark in an upper right-hand corner thereof.

For example, with reference to FIG. 4, a 50% gray image 14 is rendered with the checkerboard biasing pattern shown in FIG. 3. Thus, approximately half of the pixels will be imaged, and the expression $B*((x\%2)*2-1)*((y\%2)*2-1)$ makes it slightly more favorable to place dots on the black squares of the checkerboard (indicated by an (X) in the output document). An exemplary watermark (W) 16 is defined in the look-up table of FIG. 5. The watermark (W) is in the form of a square defined by −1 coefficients in the upper right-hand portion of the table while the remaining background has +1 values. Although not shown in this example, it is desirable to have the watermark (W) change smoothly between the −1 and +1 values to avoid abrupt visible transitions in the image.

Figure 6:
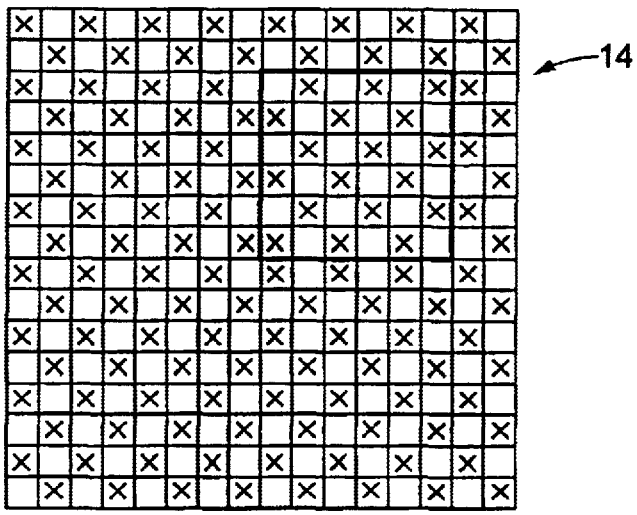
FIG. 6 illustrates the image FIG. 4 rendered with the watermark defined in the table of FIG. 5.

FIG. 6 illustrates the 50% gray image 14 of FIG. 4. rendered with the expression $W(x,y)*B*((x\%2)*2-1)*((y\%2)*2-1)$ The digital watermark 16 is introduced into the output copy by reversing the phase of the checkerboard biasing. That is, outside of the watermark (highlighted by a heavy border for illustrative purposes only), one set of squares of the checkerboard are favored (e.g. black), while within the watermark the other set of squares are favored (e.g. red).

Notwithstanding the fact that the output copy of FIG. 6 is shown with abrupt changes along the border of the watermark, the same average number of pixels (e.g. 50%) are marked resulting in a substantially uniform gray output image. In other words, the watermark is hidden in the output copy.

Figure 7:
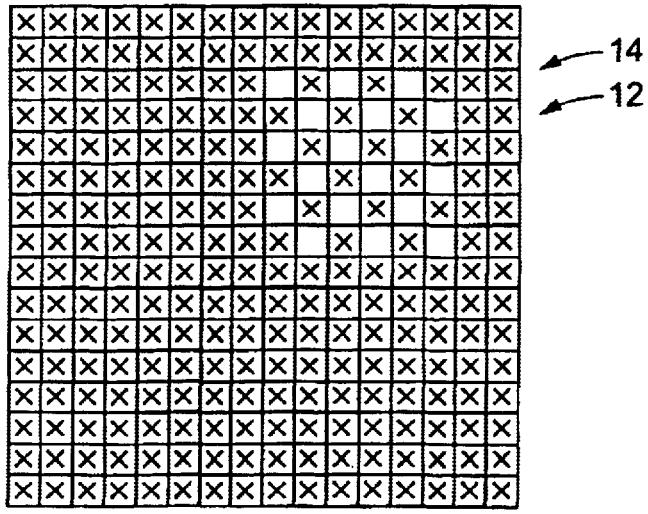
FIG. 7 illustrates the image of FIG. 6 superimposed with the biasing pattern of FIG. 3.

In order to view the watermark one need only superimpose the biasing pattern (e.g. the checkerboard pattern of FIG. 3) 12 on the output image of FIG. 6. FIG. 7 shows the output image of FIG. 6 superimposed with the biasing pattern generated by the expression $B*((x\%2)*2-1)*((y\%2)*2-1)$. As is evident from FIG. 7, the superimposed checkerboard image 12 fills in the red squares outside the border of the watermark so that the image looks black outside the watermark because all of the pixels appear to be rendered. Whereas, within the border of the watermark, the superimposed checkerboard image 12 landed on top of the red squares that were already rendered with dots due to the reversed biasing pattern. Thus, the watermark 16 does not look any darker because the watermark is maintained at the 50% gray scale level while the remainder of the image increases to the "completely on" intensity level (255).

The checkerboard pattern can be superimposed on the output copy by manually placing the checkerboard pattern directly over the output copy, or by scanning the output copy into a document processing system and then electronically superimposing the biasing pattern over the image representation of the output copy.

One important application of the above described process is the ability to determine the serial number or other identifying indicia of the marking device used to copy or generate a particular output copy. By imbedding serial number information into output copies using the described method, one can better determine who generated the output copy and/or where the output copy was generated.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, the method for imbedding hidden information in output documents that are rendered using error diffusion of the present invention can be implemented in hardware, software, firmware, or any combination thereof, as part of different types of marking devices such as copiers, printers, etc.

Having thus described the preferred embodiment(s), the invention is now claimed to be:

1. A method for imbedding a watermark in an output copy, the method comprising the steps of:
   a) providing an image representation defined by a plurality of pixels;
   b) comparing a first pixel intensity value to a threshold value;
   c) rendering a dot on an output copy, the dot having a second intensity value based on the comparison of step b);
   d) distributing a difference between the first and second intensity values among a plurality of pixels located proximate the first pixel;
   e) modifying the threshold value with a biasing value and a watermark value; and
   f) repeating steps a) through e) for each of the plurality of pixels.

2. The method of claim 1, wherein step e) includes the step of:
   obtaining the watermark value from a look-up table.

3. The method of claim 1, wherein step e) includes the step of:
   obtaining the biasing value from a high-frequency pattern with a zero mean.

4. The method of claim 1, wherein step e) includes the step of:
   obtaining the biasing value from a look-up table.

5. The method of claim 1, wherein step e) includes the step of:
   obtaining the biasing value from an analytic expression.

6. The method of claim 5, wherein the biasing value is obtained from the expression:

$$B*((x\%2)*2-1)*((y\%2)*2-1)).$$

7. The method of claim 1, further including the step of:
   g) superimposing a biasing pattern on the output copy to view the watermark.

8. A method for imbedding a watermark in an output copy, the method comprising the steps of:
   a) providing an image representation defined by a plurality of pixels;
   b) obtaining a biasing value from a high-frequency pattern with a substantially zero mean;
   c) rendering a pixel based on a threshold value, the biasing value, and a watermark value;
   d) modifying the threshold value by the biasing value and the watermark value to influence whether a dot is generated in the output copy; and
   e) repeating steps b) through d) for each of the plurality of pixels.

9. A method for imbedding a watermark in an output copy, said method comprising:
   a) providing an image representation defined by a plurality of pixels;
   b) rendering a pixel based on a threshold value, a biasing value, and a watermark value, wherein the biasing value satisfies the expression:

$$B*((x\%2)*2-1)*((y\%2)*2-1));$$

c) modifying the threshold value by varying at least one of the biasing value and the watermark value to influence whether a dot is generated in the output copy; and
   d) repeating steps b) and c) for each of the plurality of pixels, such that the watermark is hidden within the output copy.

10. The method of claim 9, wherein step c) includes the step of:
    obtaining the watermark value from a look-up table.

11. The method of claim 9, wherein obey step c) includes the step of:
    obtaining the biasing value from a look-up table.

12. The method of claim 9, further including the step of:
    e) superimposing a biasing pattern on the output copy to view the watermark.

13. A method for imbedding a watermark in an output copy, the method comprising the steps of:
    a) storing an image representation defined by a plurality of pixels;
    b) rendering the output copy using an error diffusion routine that parses through the plurality of stored pixels;
    c) modifying the error diffusion routine in step b) with a biasing pattern that influences where on the output copy each of the plurality of pixels is rendered; and
    d) further modifying the error diffusion routine in step b) with a watermark pattern that modifies the biasing pattern for pixels that are positioned within the watermark.

14. The method of claim 13, wherein step d) includes the step of:
    further modifying the error diffusion routine in step b) with a watermark pattern stored in a look-up table.

15. The method of claim 13, wherein step c) includes the step of:
    modifying the error diffusion routine in step b) with a high-frequency biasing pattern having a zero mean.

16. The method of claim 13, wherein step c) includes the step of:
    modifying the error diffusion routine in step b) with a biasing pattern stored in a look-up table.

17. The method of claim 13, wherein step c) includes the step of:
    modifying the error diffusion routine in step b) with a biasing pattern generated from an analytic expression.

18. The method of claim 13, further including the step of:
    e) superimposing the biasing pattern on the output copy to view the watermark.

* * * * *